United States Patent [19]

Pick

[11] Patent Number: 4,815,497
[45] Date of Patent: Mar. 28, 1989

[54] VALVE ASSEMBLY AND FLOW CONTROL THEREFOR

[75] Inventor: James M. Pick, Elk Grove, Ill.

[73] Assignee: Eaton Corporation, Cleveland, Ohio

[21] Appl. No.: 66,668

[22] Filed: Jun. 26, 1987

[51] Int. Cl.[4] ...................... F16K 47/08; F16K 31/06
[52] U.S. Cl. .................................... 137/883; 251/117; 251/120
[58] Field of Search ................. 251/120, 117; 137/883

[56] References Cited

U.S. PATENT DOCUMENTS 2,815,041  12/1957  Rimsha et al. ................. 251/117 X
4,621,788  11/1986  De Lew et al. ...................... 251/120

FOREIGN PATENT DOCUMENTS 0089877  5/1984  Japan ................................. 251/120

Primary Examiner—Arnold Rosenthal
Attorney, Agent, or Firm—R. A. Johnston

[57] ABSTRACT

An electromagnetically operated valve assembly and flow control capsule therefor. The valve has a single inlet and dual outlet with flow to one outlet regulatd by the flow control capsule and the flow to the second outlet unregulated. The flow control capsule is formed of plastic with an integrally hinged snap-lock cover for retaining a pressure responsive elastomeric flow control washers in the capsule. The capsule has an annular tapered rib formed about the outlet for sealing the capsule about the wall of the valve passage into which the capsule discharges flow.

13 Claims, 4 Drawing Sheets

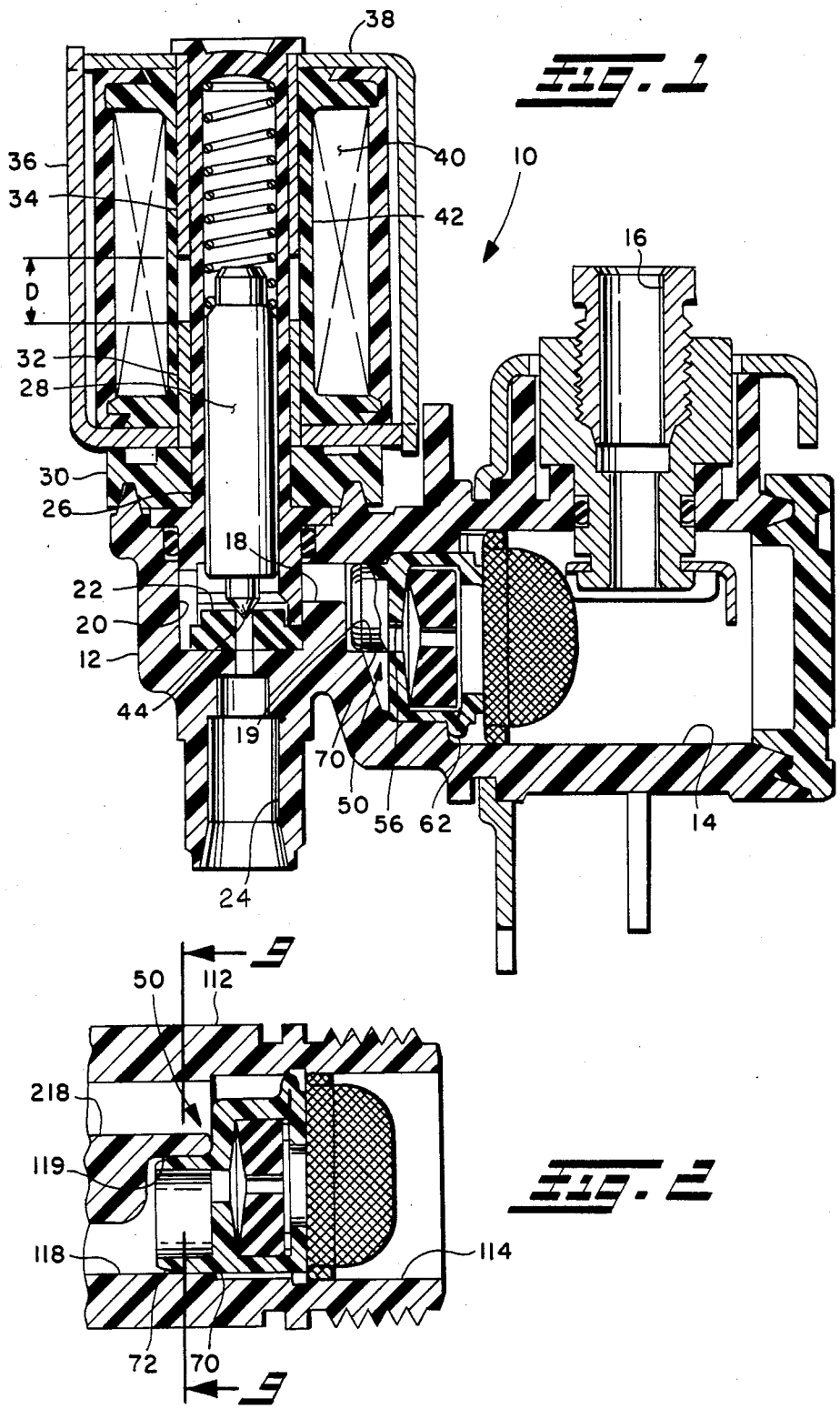

VALVE ASSEMBLY AND FLOW CONTROL THEREFOR

BACKGROUND OF THE INVENTION

The present invention relates to valves for maintaining a regulated flow fluid and particularly valves of the type which are electromagnetically actuated and employed for water inlet to appliances such as icemakers and washing machines. Valves of the aforesaid type typically have a molded plastic body with an elastomeric pressure responsive flow control regulator or member received in a controlled volume cavity therein such that the elastomeric member deforms in the cavity under the varying force of the water line pressure to constrict to enlarge the flow orifice therethrough and thus maintain a uniform rate of flow to the valving chamber.

Heretofore, in applications where elastomeric flow regulator washers are employed in appliance water inlet valves, heretofore, the elastomeric flow washer has been assembled into the precision cavity in the valve body and retained therein by suitable retaining means, typically a filter screen pressed into the inlet over the elastomeric flow washer. The nature of the operation of elastomeric flow control washers is such that very close control tolerances is required on the dimensions of the precision volume cavity for receiving the flow control washer in order to ensure proper function of the flow washer. The aforesaid manner of constructing an appliance water valve having an elastomeric flow washer in the inlet has resulted in the need to completely assemble the valve including the electromagnetic valve actuating mechanism and the valve poppet and valve seat in order to flow test the valve with the elastomeric flow washer assembled in the control volume cavity formed in the valve body.

In the event that during high volume production an elastomeric flow washer in an assembled valve failed to produce the desired rate of flow and/or failed to control the flow in the desired manner over the expected range of expected line service pressures when flow tested, the entire assembled valve was rejected and disassembled to reclaim the electromagnetic components for re-assembly onto another valve body. This sequence of events results in costly and wasteful procedures in mass production of such valve assemblies. Accordingly, it has long been desired to find a way or means of providing for assembly and flow testing of the elastomeric flow washers into the cavity in which the individual flow washer will function before the flow washer is assembled into the valve body in order to eliminate the potential for scrapping the entire assembled valve.

SUMMARY OF THE INVENTION

The present invention relates to electromagnetically actuated inlet valves for appliances of the type having a molded plastic valve body with an electromagnetic coil and armature received thereon for providing a valve controlling flow of water to the inlet of an appliance such as a washing machine or refrigerator icemaker. The valve assembly of the present invention employs an elastomeric flow control washer therein which deforms under changing line pressure to constrict or expand the flow control orifice for regulating water flow therethrough.

The valve assembly of the present invention employs an integrally molded plastic flow control capsule having the elastomeric flow control washer received therein and retained by a closure with an integrally molded hinge thereto. The flow control capsule defines a precision volume cavity having the elastomeric flow washer received therein and thus, the capsule with the flow asher may be flow tested in a simulated inlet passage or unassembled sample valve body prior to installation of the capsule into the assembled valve.

The flow control capsule has formed on its outlet an annular sealing rib which enables the capsule to be inserted into the inlet passage of the valve body and automatically sealed therearound with the periphery of the wall of the valve inlet passage.

In one embodiment of the invention, the capsule has the inlet formed in the hinged closure and the outlet with the annular rib thereof offset from the outlet of the flow washer capsule thereby enabling the capsule to be inserted and sealed about the periphery of the wall of one of a plurality of closely spaced separate inlet passages serving plural water inlets to the appliance. Plural inlets are employed, as for example, in a valve controlling water flow to refrigerator freezer compartment icemaker and through-the-door water dispenser where it is desired to provide a measured flow of water to the icemaker and an unmeasured rate of flow to the cold water dispenser.

The present invention thus provides a unique and novel valve employing self-contained flow regulator capsule which enables flow calibration of the capsule with the elastomeric flow washer received in the actual cavity in which it will function with the capsule separate from the assembled valve into which it will be inserted. The capsule preferably has an offset outlet to enable insertion and sealing of the outlet in one of a plurality of closely spaced water inlet passages in a dual path valving arrangement.

An added benefit of the offset location of the seal bead is that the forces and the resultant distortion when the capsule is pressed into the body are not transferred to the flow washer seat area.

BRIEF DESCRIPTION OF THE DRAWINGS

FIG. 1 is a cross-section through the plane of symmetry of a single inlet valve assembly employing the flow control capsule of the present invention;

FIG. 2 is a portion of the inlet of a valve similar to FIG. 1, but having plural valve inlet passages;

DETAILED DESCRIPTION

Figure 4:
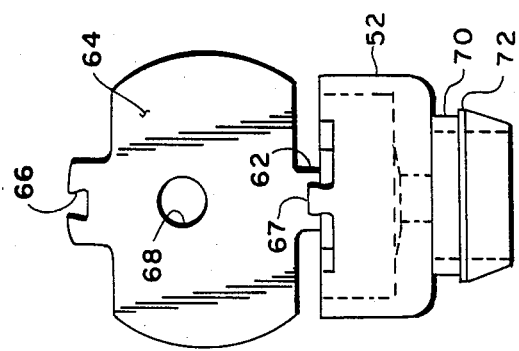
FIG. 4 is a righthand view of the capsule of FIG. 3.
Figure 5:
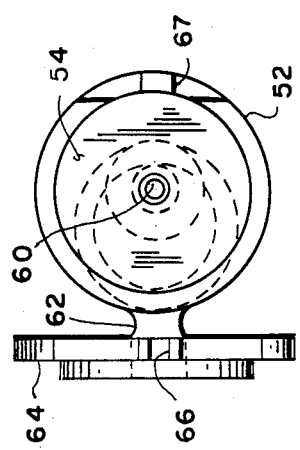
FIG. 5 is a top view of the capsule of FIG. 3.
Figure 3:
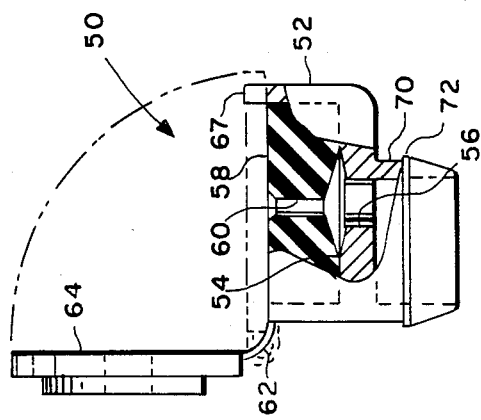
FIG. 3 is a side view of the flow control capsule of the present invention.
Figure 6:
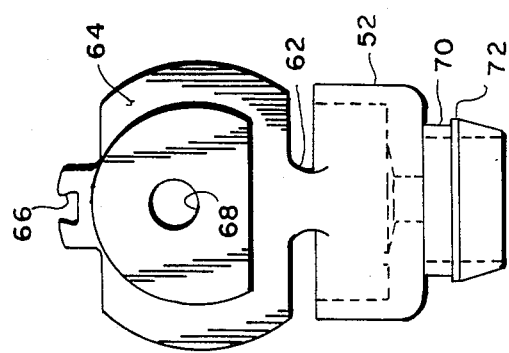
FIG. 6 is a lefthand side view of the capsule of FIG. 3.
Figure 7:
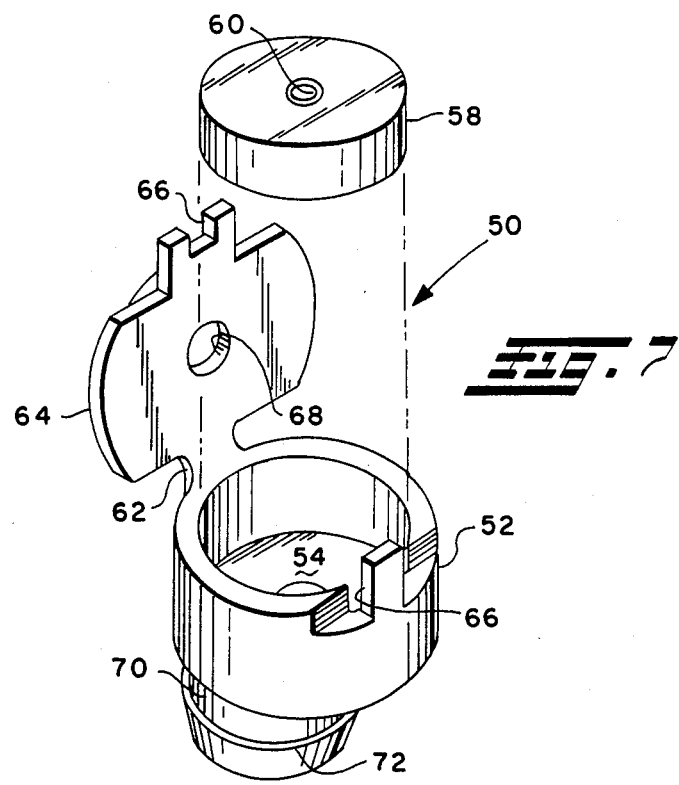
FIG. 7 is an exploded isometric view of the flow control capsule of FIG. 3.

Referring to FIG. 1, the valve assembly is shown generally at 10 as having a valve body 12 defining an inlet chamber 14 supplied through a compression-type tube fitting inlet 16 and a single inlet passage 18 communicating chamber 14 with a valving chamber 20 having a valve seat washer 22 received therein which permits flow therethrough to the outlet 24. The valving chamber 20 is sealed by a tubular guide member 26 which has a ferromagnetic armature 28 slidably received therein; and, the guide 26 is retained on the body by a suitable retaining ring 30.

A first ferromagnetic tubular pole piece 32 is received over the armature guide 30 and a second tubular ferromagnetic pole piece 34 is received over the armature guide 30 and spaced from the first pole piece 32 by an amount denoted by the reference character "D" to create an air gap in the flux path and; the, flux path is closed by a suitable ferromagnetic pole frame comprising the generally L-shaped pieces 36, 38. A suitable coil 40 formed preferably of magnet wire is wound about a bobbin 42 to provide the magnetomotive force required to lift the armature upon energization of the coil.

The lower end of the armature 28 has formed thereon a suitable poppet 44 which contacts the valve seat washer 22 to provide the valving of fluid flow through the inlet passage 18 to outlet passage 24. A suitable armature return spring biases the armature to the downward position seating the poppet 44 against the seat washer 22 to move the valve to a closed position. It will be understood that upon energization of the coil 40, the armature 28 is lifted in an upward direction since whereupon the poppet 44 is moved away from the seat washer 22 and permits fluid flow from inlet passage 18 to the outlet 24.

With reference to FIGS. 1 and 3–6, a flow control capsule subassembly indicated generally at 50 as having a body portion 52 having a generally cup-shaped configuration and defining a precision volume cavity 54 and having an outlet passage 56 provided in the open end thereof. An elastomeric flow control washer 58 is received in the cavity 54 in precision closely fitting relationship. The flow washer 58 has a precision flow control orifice 60 formed therethrough and aligned with capsule outlet 56 and has also a preferably concave surface formed on the downstream face thereof with respect to the flow control orifice. As is well known in the art, the flow control washer 58 deforms under increasing upstream water line pressure downwardly such that the concave face flattens out to register along the closed end of the cavity 54 and upon further pressure increases deforms the orifice 60 so as to maintain a constant flow therethrough irrespective of the variations in pressure.

The body 52 of the capsule 50 has integrally formed therewith, a flexible hinged portion 62 which attaches at one end thereof with the outer periphery of the rim of the open end of the body and the other end of the integrally formed hinge 62 attaches in integrally formed fashion to a closure member 64 which has formed on the periphery thereof, diametrically opposed to the hinge a slot or bifurcated portion 66 which, upon closure, engages in snap-locking arrangement with a suitable lug or tab 67 extending from the rim of the body 52 at a location disposed diametrically opposite the hinge 62. The closure 64 is located or folded from the position indicated in solid outline in FIG. 3 to the position indicated in dashed outline in FIG. 3, and the reset 66 is snap locked over the tap 67 to maintain the closure in a position operative to retain the flow water 58 in the capsule.

The closure 64 has provided therethrough an inlet orifice 68 which is aligned with the flow control orifice 60 in the flow washer. The closed end of the cup-shaped capsule body 52 has an annular extension 70 integrally formed therewith with the interior thereof communicating with the outlet orifice 56. The extension 70 is preferably formed offset with respect to the orifice 56; and, the extension 70 has provided about the periphery thereof an annular rib 72 which is sized to innerfit the passage in the valve into which the capsule will discharge in a manner which will hereinafter be described in greater detail.

Referring to FIG. 1, the capsule extension 70 is shown as received in an enlarged portion 19 of the inlet passage 18 has the extension and annular rib 72 of the capsule assembly received therein and the rib 72 engages the wall of the passage 19 in a fluid pressure sealing manner. In this arrangement, it will be understood that all fluid flow entering the capsule 50 is discharged through the capsule outlet and orifice 56 and is thus regulated.

Figure 9:
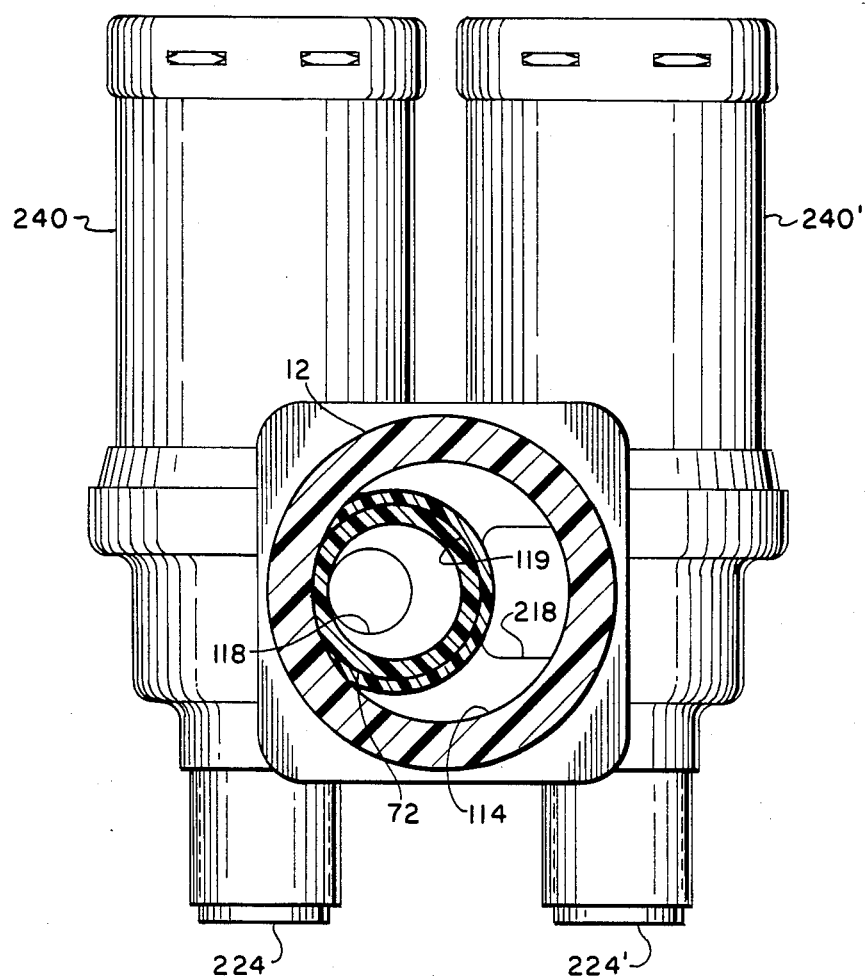
FIG. 9 is a section view taken along section-indicating lines 9—9 of FIG. 8.

Referring now to FIG. 2, the flow control capsule assembly 50 is shown as employed in a valve body 112 which comprises an alternate embodiment of the valve formed with the inlet chamber 114 communicating with a plurality of separate fluid inlet passages 118, 218. In the embodiment of FIG. 2, the outlet extension 70 and rib 72 are received in an enlarged portion 119 of the passage 18 and the passage 218 receives flow from chamber 114 directly and flow to passage 218 does not pass through the flow control capsule. It will be understood that in the embodiment of FIG. 2, the dual inlet passages 118, 218 supply fluid to dual valving arrangements shown as coils 240,240' in FIG. 9, each having an armature and coil arrangement similar to armature 28 and coil 40 to enable separate valving of the flow in the passages 118, 218 supplying separate outlets 224,224'. Such an arrangement would find application in a household refrigerator where it is desirable to have regulated flow in the passage 118 to an icemaker in the refrigerant freezer compartment and to permit unregulated flow in the passage 218 for a through-the-door cold water dispenser.

Figure 8:
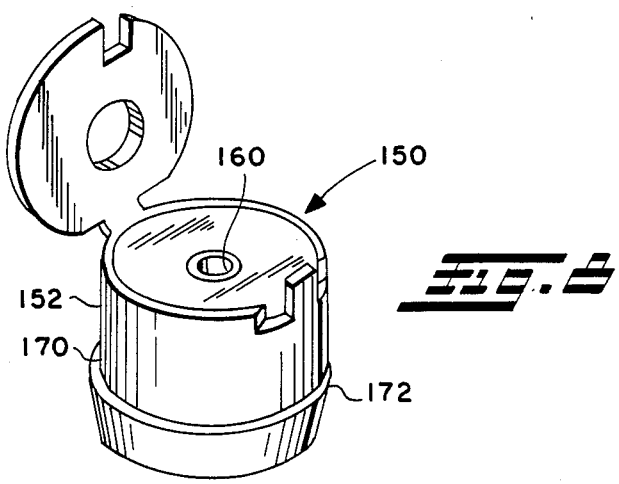
FIG. 8 is an isometric view of an alternate embodiment of the flow control capsule.

Referring to FIG. 8, an alternate embodiment indicated of the flow control capsule assembly is indicated generally at 150 and has the extension 170 about the outlet thereof formed as a straight continuation of the outer periphery of the capsule body 152 and the annular rib 172 formed therearound for sealing in an inlet passage having the flow capsule orifice 160 aligned coaxially therewith. The embodiment of FIG. 8 is thus adapted for installation in an inlet passage where it is not necessary or desired to offset the flow control washer from the inlet passage.

The present invention thus provides a unique flow control capsule assembly which may be calibrated separately from the valve into which it is to be installed and after flow testing is inserted into the valve inlet and has therewith, an integrally formed seal rib for preventing bypass of fluid around the flow capsule. The flow capsule assembly of the present invention is adaptable for installation in the inlet of a valve having plural inlet passages to permit regulated flow through the capsule to one passage and unregulated flow around the capsule to a separate passage.

The flow control capsule of the present invention provides a precision cavity for receiving an elastomeric flow control washer therein which is retained by a integrally formed hinged snap-locking closure cover, and thus provides a simple and low cost flow control assembly which may be calibrated separately from a valve to which it is to be installed.

Although the invention has hereinabove been described with respect to the illustrated embodiments, it will be understood that the invention is capable of variation and modification and is limited only by the following claims.

I claim:

1. A flow control capsule assembly comprising:
  (a) a cup shaped housing having the interior thereof sized and configured to define therein, a pressure supporting cavity having received therein a pressure responsive elastomeric flow control washer, with an outlet orifice formed in the closed end of said cup shape;
  (b) a cover having an inlet orifice therein, and having portions thereof integrally formed with said housing for providing a hinged connection of said cover to said housing for effecting a closure for said cup shape for retaining said flow control washer therein; and
  (c) said housing having the exterior thereof configured to form sealing means adapted to sealingly engage the inner periphery of a flow passage into which said capsule is intended to discharge.

2. The capsule assembly defined in claim 1, wherein said cup-shaped housing and said cover are formed of plastic material.

3. The capsule assembly defined in claim 1, wherein said annular sealing means comprises an annular rib disposed about said outlet orifice.

4. The capsule assembly defined in claim 1, wherein said sealing means comprise an annular rib having a tapered configuration for retention of said capsule upon insertion in a passage.

5. The capsule assembly defined in claim 1, further comprising a tubular extension extending from the exterior of said closed end of said cup shape, said extension having said annular sealing means formed about the periphery thereof.

6. The capsule assembly defined in claim 1, further comprising a tubular extension extending from the exterior of said closed end of said cup shape, said extension having said sealing means formed about the periphery thereof with said extension offset with respect to said outlet orifice.

7. The capsule assembly defined in claim 1, wherein said sealing means comprises an annular rib formed about the periphery of a tubular extension extending from the exterior of said closed end of said cup shape, with said tubular extension offset with respect to said outlet orifice.

8. The capsule defined in claim 1, wherein said sealing means comprises an annular tapered rib.

9. The capsule assembly defined in claim 1, wherein said cup-shaped housing and said cover are formed of plastic material.

10. A valve assembly for an appliance comprising:
  (a) body means defining an inlet passage communicating with first and second separate flow passages each adapted for connection to an appliance function;
  (b) electromagnetic valve means disposed to effect valving of flow in each of said first and second flow passages; and
  (c) a flow control capsule sub-assembly having a capsule housing with an inlet orifice communicating with said inlet passage, said capsule housing having a chamber formed therein having pressure responsive flow regulating means disposed therewith and an outlet communicating with said second of said flow passages, said capsule housing having formed integrally therewith means sealing the outlet of said capsule housing about the wall of said second passage other than through said capsule, said means sealing said outlet comprising an annular rib formed on the periphery thereof and operative to frictionally engage the wall of said second flow passage; and,
  (d) said body means is operative to permit a portion of flow from said body means inlet passage to flow unregulated directly to said first passage.

11. A valve assembly for an appliance comprising:
  (a) body means defining an inlet passage communicating with first and second separate flow passages each adapted for connection to an appliance function;
  (b) electromagnetic valve means disposed to effect valving of flow in each of said first and second flow passages; and
  (c) a flow control capsule sub-assembly having a capsule housing with an inlet orifice communicating with said inlet passage, said capsule housing having a chamber formed therein having pressure responsive flow regulating means disposed therewith and an outlet communicating with said second of said flow passages, said capsule housing formed integrally therewith means sealing the outlet of said capsule housing about the wall of said second passage and operable to prevent flow to said second passage other than through said capsule, said capsule housing having a generally cylindrical configuration, and said means sealing said outlet comprising an annular rib formed thereabout with said rib disposed offset with respect to the inlet of said capsule; and,
  (d) said body means is operative to permit a portion of flow from said body means inlet passage to flow unregulated directly to said first passage.

12. A valve assembly for an appliance comprising:
  (a) body means defining an inlet passage communicating with a flow passage adapted for connection to an appliance function;
  (b) electromagnetic valve means disposed to effect valving of flow in said flow passage;
  (c) a flow control capsule sub-assembly having a capsule housing with an inlet orifice communicating with said inlet passage said capsule housing having a chamber formed therein having a pressure responsive elastomeric flow regulator received therein and an outlet communicating with said flow passage, said capsule housing including an integrally formed annular means sealing the outlet of said capsule about the wall of flow passage, wherein upon insertion of said annular sealing means in said flow passage flow from said inlet passage to said flow passage is exclusively through said flow control capsule, said integrally formed means sealing the outlet of said capsule comprising an annular sealing rib.

13. A valve assembly for an appliance comprising:
  (a) body means defining an inlet passage communicating with a flow passage adapted for connection to an appliance function;
  (b) electromagnetic valve means disposed to effect valving of flow in said flow passage;
  (c) a flow control capsule sub-assembly having a capsule housing with an inlet orifice communicating with said inlet passage said capsule housing having a chamber formed therein having a pressure responsive elastomeric flow regulator received therein and an outlet communicating with said flow passage, said capsule housing including an integrally formed annular means sealing the outlet of said capsule about the wall of flow passage, wherein upon insertion of said annular sealing means in said flow passage flow from said inlet passage to said flow passage is exclusively through said flow control capsule, said capsule having a hinged closure member integrally formed therewith and snap-locked over said elastomeric flow regulator.

* * * * *